United States Patent
Wu et al.

(10) Patent No.: US 7,142,369 B2
(45) Date of Patent: Nov. 28, 2006

(54) VARIABLE FOCUS LIQUID LENS

(75) Inventors: Shin-Tson Wu, Oviedo, FL (US); Hongwen Ren, Orlando, FL (US)

(73) Assignee: Research Foundation of the University of Central Florida, Inc., Orlando, FL (US)

( * ) Notice: Subject to any disclaimer, the term of this patent is extended or adjusted under 35 U.S.C. 154(b) by 0 days.

(21) Appl. No.: 11/040,446

(22) Filed: Jan. 21, 2005

(65) Prior Publication Data

US 2006/0164731 A1   Jul. 27, 2006

(51) Int. Cl.
*G02B 3/12* (2006.01)
*G02B 15/14* (2006.01)
*G02C 5/00* (2006.01)

(52) U.S. Cl. .................. 359/666; 359/676; 351/154

(58) Field of Classification Search ........ 359/665–667, 359/676; 351/154
See application file for complete search history.

(56) References Cited

U.S. PATENT DOCUMENTS

| | | | |
|---|---|---|---|
| 5,138,494 A | 8/1992 | Kurtin | 359/666 |
| 5,526,067 A | 6/1996 | Cronin et al. | 351/41 |
| 5,684,637 A | 11/1997 | Floyd | 359/666 |
| 5,999,328 A | 12/1999 | Kurtin et al. | 359/666 |
| 6,040,947 A | 3/2000 | Kurtin et al. | 359/666 |
| 6,369,954 B1 | 4/2002 | Berge et al. | 359/666 |
| 6,493,151 B1 | 12/2002 | Schachar | 359/666 |
| 6,665,127 B1 | 12/2003 | Bao et al. | 359/665 |
| 6,715,876 B1 | 4/2004 | Floyd | 351/159 |

FOREIGN PATENT DOCUMENTS

DE  19710668 A1 * 9/1998

* cited by examiner

*Primary Examiner*—Ricky Mack
*Assistant Examiner*—William Choi
(74) *Attorney, Agent, or Firm*—Brian S. Steinberger; Law Offices of Brian S. Steinberger, P.A.

(57) ABSTRACT

A liquid-filled variable focus lens cell is disclosed. The liquid lens cell consists of four parts: a clear distensible membrane, a transparent wall member, liquid with a fixed volume stored in lens cell chamber, and an annular periphery sealing ring. The inner surfaces of the annular sealing ring are sealed with distensible membrane. The radius of the annular sealing ring is changeable, similar to a conventional iris diaphragm. By tuning the radius of the annular sealing ring, the stored liquid in the lens cell will be redistributed, thus change the curvature of the distensible membrane. Therefore, the liquid lens cell can cause light to converge or diverge. The liquid filled lens can be operated mechanically or automatically.

20 Claims, 7 Drawing Sheets

VARIABLE FOCUS LIQUID LENS

This invention relates to an optical focusing system, in particular to a liquid-based lens, device, system and its associated zoom lens, device or system wherein the focal length of the lens is variable.

BACKGROUND AND PRIOR ART

Liquid filled lens with variable focus have been proposed over the years for eyeglasses, cameras, camcorders, telescopes, binoculars, projectors as well as other machine vision applications. According to the lens operating mechanisms and liquid lens structures mentioned in several patents, the described lenses can be separated into two types. The first type is the liquid lens having a fixed volume of clear liquid which is sandwiched between a rigid lens or a planar substrate and a thin transparent elastic membrane, as described in U.S. Pat. Nos. 5,138,494 to Kurtin; 5,526,067 to Cronin et al.; 5,999,328 to Kurtin et al.; and 6,040,947 to Kurtin et al. By moving the periphery of the elastic membrane, the liquid inside the lens assembly is redistributed such that the curvature of the film is changed. The changed curvature of the liquid lens surface bounded by the elastic membrane can vary the optical power, also known as diopter, of the lens. The shortcoming of this kind of liquid lenses is that one can not easily keep the periphery of the elastic membrane parallel to that of the rigid lens or planar substrate during the distance change. Moreover, the operating system for tuning the focus is complicated.

The second type of liquid lens requires the pumping of liquid in or out the lens chamber to change the curvature of the elastic membrane surface, thus tuning the focus of the liquid lens as described in U.S. Pat. No. 5,684,637 to Floyd and U.S. Pat. No. 6,715,876 to Floyd. For the lenses operating by injecting or pumping liquid into the body of the lens, a complicated control system is usually needed; thus such lenses are bulky, expensive and sensitive to vibration. Similar to a conventional solid lens, a common feature of the abovementioned liquid lenses is that the diameter of the lens does not vary during the focus change.

Different from the above mentioned liquid lenses, another type of lens with variable focus obtained by changing its diameter was reported in U.S. Pat. No. 6,493,151 B2 to Schachar and is characterized as an elastically deformable lens. By making small changes in the equatorial diameter of the lens, the lens can be deformed by radial tension exerted in a plane generally perpendicular to the optical axis. The drawback of this kind of lens is that the control system used to change its diameter is complicated. The process for changing the focal length is quite complicated and sometimes inefficient.

Another kind of variable focus liquid lens is different from the above lenses; see for example, U.S. Pat. No. 6,369,954 to Berge et al. and U.S. Pat. No. 6,665,127 Bao et al. The focal length of the liquid lens is tuned by applying an external voltage. Usually the voltage applied to the liquid lens is very high (>200 volts) so that the power consumption is high. Power consumption is an important issue for portable devices as it is determined by battery life. The lens structure and the power supply system are complicated and expensive.

In the present invention, a tunable-focus liquid lens is adhesively attached to a circular periphery seal which looks like a conventional iris diaphragm with an impeller structure to impart movement and pressure to the fluid filled lens. The circular periphery seal can be operated mechanically or electro-mechanically to change the radius of the liquid lens. For example, if the radius is reduced, then the curvature of the elastic membrane becomes convex and a positive (or converging) lens is formed. On the other hand, if the radius is increased, then the membrane curvature becomes concave so that a negative (or diverging) lens is formed.

SUMMARY OF THE INVENTION

The first objective of the present invention is to provide a simple liquid lens with a variable focal length.

The second objective of the present invention is to provide a liquid lens device wherein the focal length of the lens can be varied from infinity to some distance, or from one focal length to another focal length. Such a lens can be transformed from convex to concave or from concave to convex.

The third objective of the present invention is to produce a tunable-focus liquid lens with high transparency, sharp and clean image, high resolution, and aberration-free.

The fourth objective of the present invention is to provide a method for making a variety of lenses, such as bioconvex, bioconcave, plano-convex, plano-concave, concavo-convex, or biplano lenses. The aforementioned lenses include spherical and cylindrical lenses.

The fifth objective of the present invention is to provide a method for making a zoom lens system using two or more of the liquid lenses of the present invention. The zoom lens does not require adjusting the distance between the lenses. Rather, the tenability is achieved by controlling the diameter of the liquid lens.

The sixth objective of the present invention is to provide a lens operated either mechanically or automatically or electromechanically.

The seventh objective of the present invention is to provide a large aperture eyeglass with simple focus control. This feature allows the eyeglass wearer to conveniently adjust the diopter or power of the lens.

A preferred liquid-filled variable focus lens system can be prepared with a transparent wall member, a transparent distensible membrane, a layer of liquid stored between the wall member and the distensible membrane to form a liquid lens, and a rigid annular periphery seal with a variable radius, between the transparent wall member and the transparent distensible membrane.

A preferred wall member is adhesively attached to the rigid periphery seal and can be a rigid planar substrate, a rigid plano-convex lens, a rigid plano concave lens, a rigid biconvex lens, a biconcave lens or the wall member can be a thin distensible membrane.

A preferred transparent distensible membrane is adhesively attached to the rigid periphery seal and can be an elastomeric rubber, a rubber-like compound, an elastic polymer or polyvinylidene chloride film (Saran).

A preferred rigid periphery seal between the transparent wall member and the transparent distensible membrane is a rigid annular ring containing rotatable impellers with a variable radius having an inner surface of the rigid annular ring covered or wrapped with a distensible membrane. Alternatively, the rigid periphery seal can be a conventional iris diaphragm wrapped in a distensible membrane. The distensible membrane is adhesively attached to the periphery seal.

The rotatable impellers incorporated in the rigid periphery seal are controlled by a lever actuator which is rotated either mechanically or automatically.

A preferred zoom lens is provided that consists of at least two liquid lenses of the present invention, wherein the zooming ratio is adjusted by the curvature of the membrane covering the lens rather than the distance between the lenses.

A preferred rigid annular periphery seal for a variable focus, fluid-filled lens can be assembled with a lever actuator, a movable impeller, and a distensible membrane cover that permits the variation of the radius of the periphery seal when the movable impeller and lever actuator are operated as in parts of a conventional iris diaphragm.

The preferred process for making a variable focus liquid-filled lens includes forming a cavity between a first transparent membrane and a second transparent membrane, with at least one of the membranes being flexible, then filling the cavity with a fixed amount of a transparent fluid to form a liquid lens, sealing the cavity with a periphery sealing ring containing a lever actuator and a movable impeller covered with a distensible membrane that is operated to produce variations in the radius of the periphery sealing ring.

The preferred first transparent membrane can be flexible or distensible and made of elastomeric rubber, a rubber-like compound, elastic polymer, and elastic Saran.

The preferred second transparent membrane can be rigid or flexible and made of a glass plate, a clear crystal plate, transparent plastic, rigid clear polymer, elastomeric rubber, a rubber-like compound, and elastic Saran.

The preferred periphery sealing ring is made of a light-weight plastic, light-weight metal, light-weight crystal, light-weight glass, or a light-weight, solid polymeric resin.

A more preferred periphery sealing ring is a conventional iris diaphragm with a common rigid circular frame, a lever actuator connected to movable impellers and wrapped in a distensible membrane. When the periphery sealing ring is incorporated in the variable focus liquid lens of the present invention, it functions to seal the liquid lens and change the radius of the periphery sealing ring such that liquid in the lens is redistributed.

Further objects and advantages of this invention will be apparent from the following detailed description of a presently preferred embodiment that is illustrated schematically in the accompanying drawings.

BRIEF DESCRIPTION OF THE FIGURES

FIG. 9 is a zoom lens consisting of two or more liquid lens. The image in the focal plane is upright, rather than inverted as seen from a single lens.

DESCRIPTION OF THE PREFERRED EMBODIMENTS

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation. The term "fluid" is used interchangeably with "liquid" herein. The terms "flexible" and "distensible" are used interchangeably herein.

The key element of the fluid-filled liquid lens of the present invention is the circular periphery seal which looks like a conventional iris diaphragm. The circular periphery seal is reminiscent of the iris of the eye in its action; the diameter of an approximately circular opening is controlled by regulating the aperture of the seal's circular opening. Inside the aperture of the seal is a liquid-filled lens with at least one distensible or flexible membrane cover.

The fabrication of a fluid lens with a variable focal length is described in detail below, beginning with the fabrication of a convex and concave lens. Someone skilled in the art can easily perform the fabrication process for the different types of lenses.

In the present invention, the tunable-focus liquid lens is fabricated with a fixed volume of clear or tinted fluid encapsulated between a first elastic membrane and a second transparent substrate to form the liquid lens. The liquid lens is attached by adhesives to a rigid, circular periphery seal fitted with a lever actuator and a rotatable element that imparts movement and pressure to the fluid filled lens. A rotatable element, hereinafter referred to as a "rotatable impeller", is adhesively attached to the circular periphery seal. The rotatable impeller has a number of movable thin curved plates fastened at regular intervals around the inside of a ring, the positions of which are simultaneously adjusted by a lever actuator on the outside of the circular periphery seal. When fully assembled, the circular periphery seal is wrapped using an elastic membrane similar to the elastic membrane that confines the liquid lens. Mechanical or automatic adjustments of the lever actuator move the rotatable impeller and change the radius of the circular periphery seal surrounding the liquid lens. When the radius is reduced, the curvature of the elastic membrane becomes convex and a positive or converging lens is formed. When the radius is increased, the membrane curvature becomes concave so that a negative or diverging lens is formed.

In an alternate embodiment, iris diaphragms that are commercially available, can be purchased from many suppliers, such as, Edmund Industrial Optics, Barrington, N.J., USA and used as the circular periphery seal of the present invention. The iris diaphragm purchased from a supplier should have three parts, including a common rigid circular frame, a lever actuator connected to rotatable impellers with the rotatable impellers fixed on the circular frame. The circular frame can be used as the periphery seal of the liquid lens. The commercially available iris diaphragm is then wrapped in a distensible membrane before it is adhesively attached to the liquid lens as a seal with a variable radius.

The materials useful in the fabrication of the liquid lens of the present invention are described below, but are not intended to limit the choice of materials, as someone skilled in the art could easily select materials that perform the desired function.

The first elastic membrane is preferably a flexible, transparent, water impermeable material, such as Saran (polyvinylidene chloride resins or films) rubber or an elastic polymer.

The second transparent substrate is also referred to herein as the wall member and can be the same material as the first elastic membrane, preferably somewhat rigid, water impermeable, such as Saran (polyvinylidene chloride resins or films), poly carbonate, rubber, elastic polymer, glass plate, transparent crystal plate, or a transparent rigid polymer.

The fluid encapsulated by the first elastic membrane and the second transparent substrate is preferably colorless. However, the fluid can be tinted, depending on the application. For example, if the intended application is for sunglasses, the fluid is preferably tinted. Fluids having an appropriate index of refraction and viscosity suitable for use in the lens cell are degassed water, mineral oil, glycerin and silicone products among others.

The circular or annular sealing ring is preferably a lightweight plastic, metallic or glass frame fitted with a lever actuator, and provides an air tight seal at the periphery of the fluid-filled lens cell chamber. The annular sealing ring is adhesively sealed with a distensible membrane, such as Saran, rubber or elastic polymer.

The adhesive used herein for sealing the various structures is preferably cyanoacrylate, commonly known as "super glue," or epoxy adhesive; alternatively, the liquid-filled lens, eyeglass frames and circular periphery seal can be fastened by screws.

Figure 1:
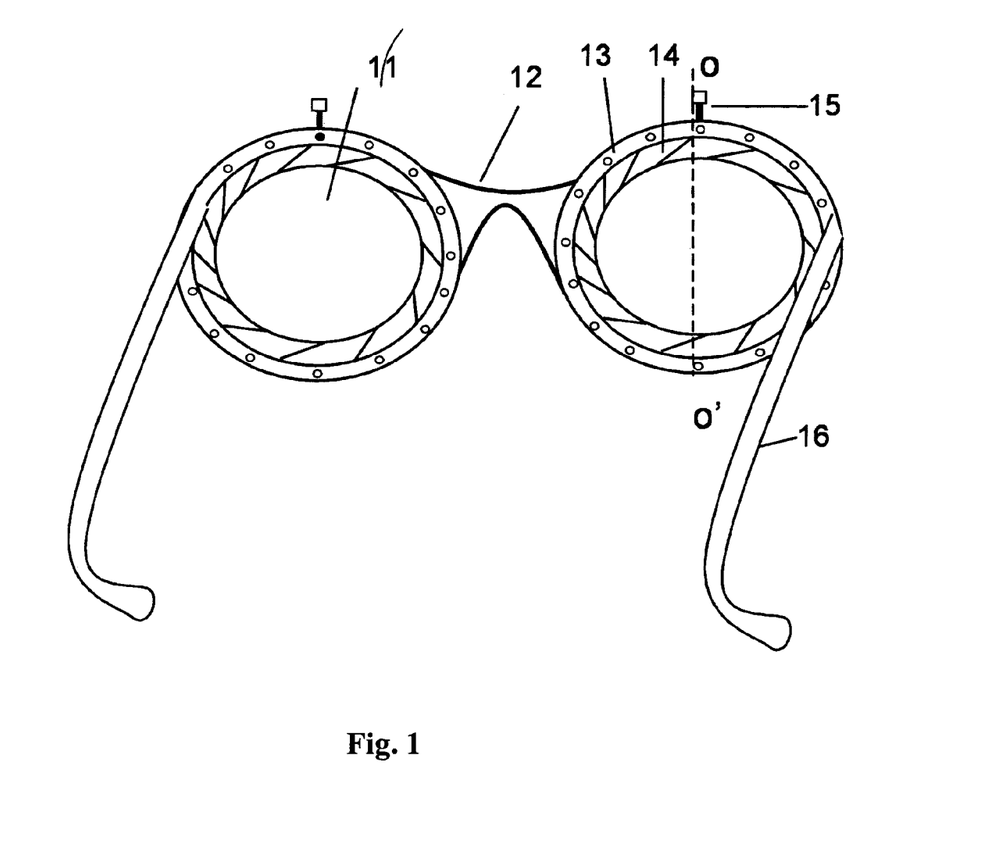
FIG. 1 is a view of a pair of spectacles using variable focus lenses according to the present invention, viewed from the wearer's side of the glasses.

FIG. 1 shows a pair of spectacles wherein the lens aperture 11, is surrounded by rotatable impellers 14 that are connected to the rigid periphery seal 13 inside frame 12. Lever actuator 15 controls the movement of the rotatable impellers 14. Attached to frame 12 are a pair of supporting arms 16 that hold the spectacles in place, on the head of the wearer.

Figure 2A:
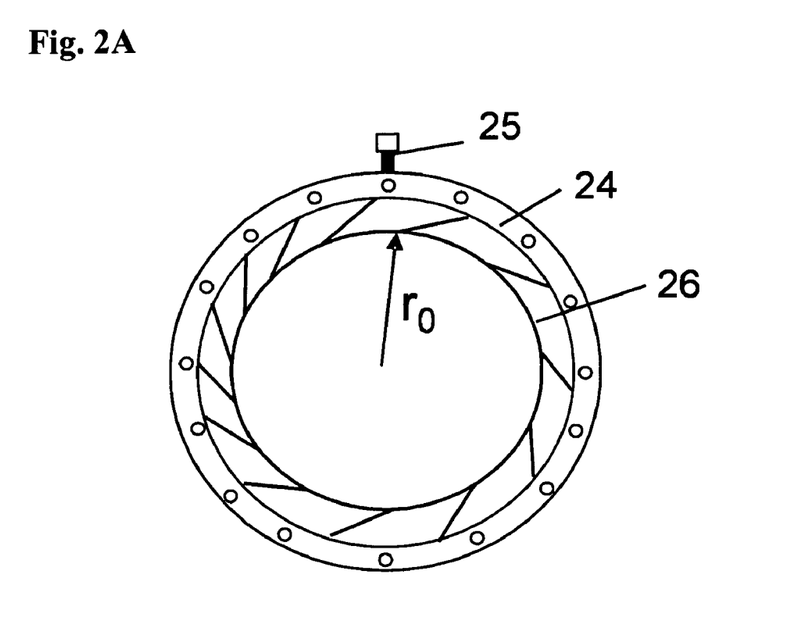
FIG. 2A is the top view of a circular periphery seal similar to a diaphragm structure. The radius of the aperture is $r_0$.
Figure 2B:
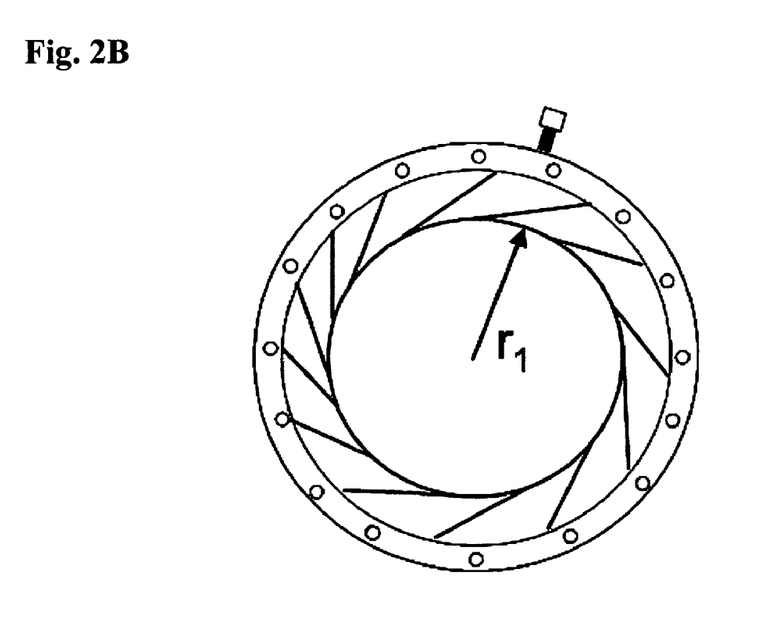
FIG. 2B is the structure as shown in FIG. 2A with radius of the aperture $r_1$ ($r_1 < r_0$).
Figure 2C:
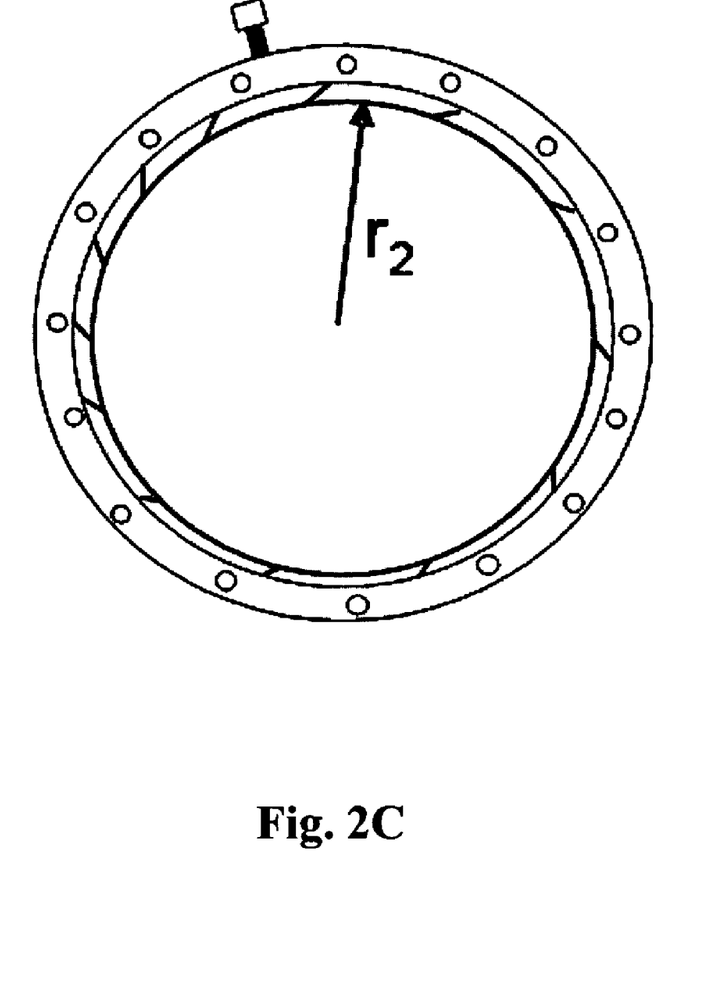
FIG. 2C is the structure as shown in FIG. 2A with radius of the aperture $r_2$ ($r_2 > r_0$).

FIG. 2 is the front view of the circular periphery seal of the liquid lens. The rigid periphery seal 24, is fitted with a lever actuator 25 that controls the movement of the rotatable impellers 26. In FIG. 2A, the radius of the aperture is $r_0$. In FIG. 2B, the radius of the aperture is reduced to $r_1$ ($r_1 < r_0$) by rotating the lever actuator 25 in a clockwise direction. In FIG. 2C, the radius of the aperture is enlarged to $r_2$ ($r_2 > r_0$) by rotating the lever actuator 25 in a counterclockwise direction.

Figure 3:
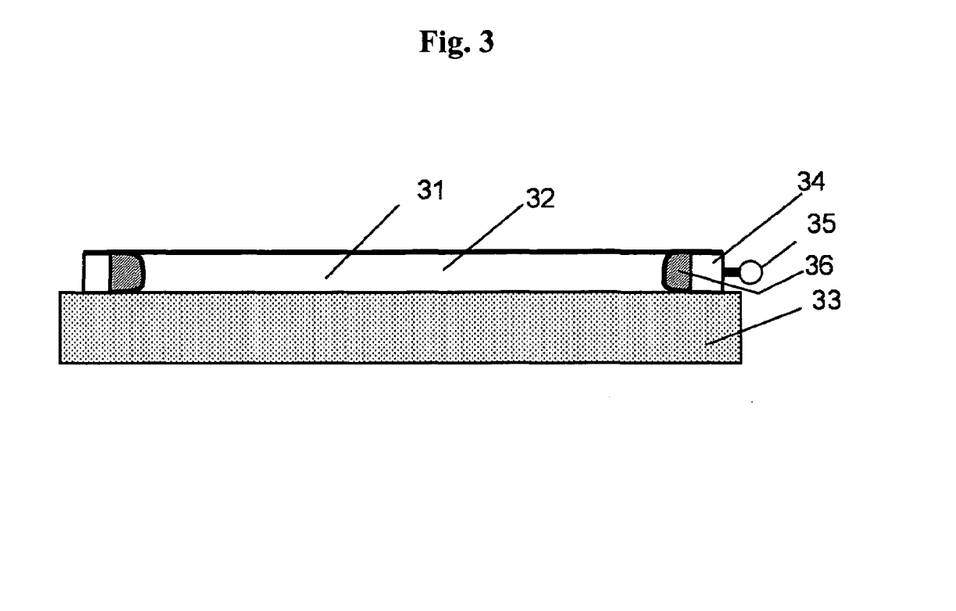
FIG. 3 is a cross-sectional view of one fluid lens cell of the present invention with no focus effect with an aperture radius $r_0$ as shown in FIG. 2A

FIG. 3 shows a cross-section of one fluid filled lens along the line O to O' of FIG. 1. A liquid 31 is contained by a clear distensible membrane 32 on one side and a clear planar substrate 33 on the opposite side. Positioned at a point on the rigid periphery seal 34 is a lever actuator 35 that is functionally connected to the rotatable impellers 36. The lever actuator 35 is in a neutral position such that the surface of the clear distensible membrane 32 is flat.

Figure 4:
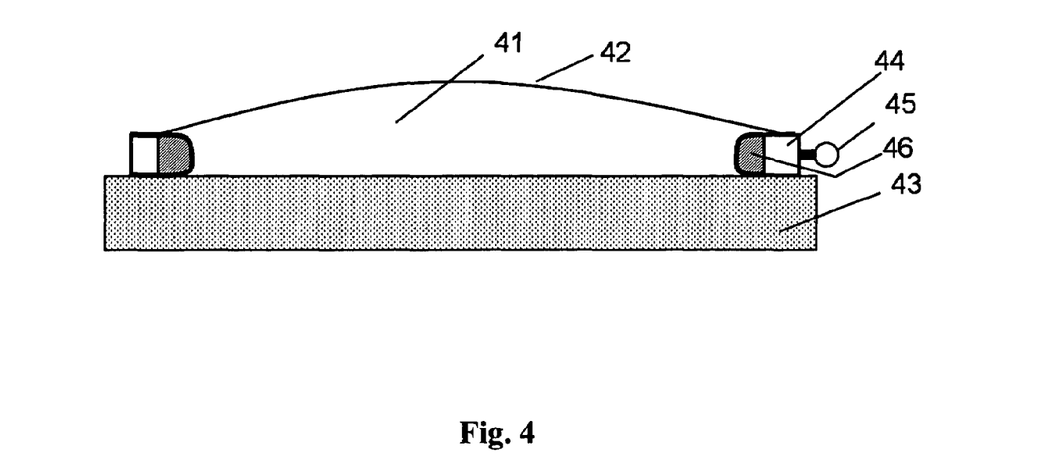
FIG. 4 is a cross-sectional view of one fluid lens cell of the present invention in a convex lens formation with aperture radius $r_1$ as shown in FIG. 2B. ($r_1 < r_0$)

In FIG. 4, the liquid 41 causes the clear distensible membrane 42 to form a convex shape opposite the clear planar substrate 43, when the lever actuator 45 in the rigid periphery seal 44 is engaged in such a manner as to extend the rotatable impellers 46 to a greater distance into the liquid 41 and reducing the radius of the lens.

Figure 5:
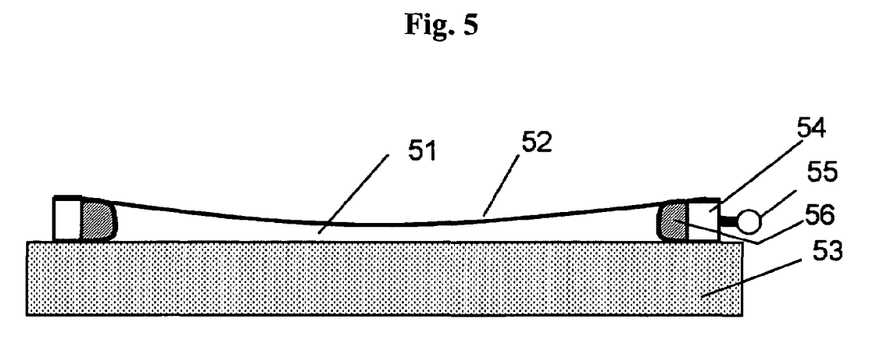
FIG. 5 is a cross-sectional view of one fluid lens cell of the present invention in a concave lens formation with aperture radius $r_2$ as shown in FIG. 2C. ($r_2 > r_0$)

FIG. 5 shows the effect of retracting the distance to which the rotatable impellers 56 are extended into the liquid 51. In FIG. 5, the liquid 51 is within a clear distensible membrane 52 having a concave shape while the clear planar substrate 53 supports the fluid filled portion with a rigid periphery seal 54 in which a lever actuator 55 is engaged in such a manner to retract the rotatable impellers 56 to a point where there is minimal protrusion into the liquid 51. The position of the rotatable impellers 56 allows the fluid filled lens to form a concave shape, while the radius of the lens in increased.

Figure 6:
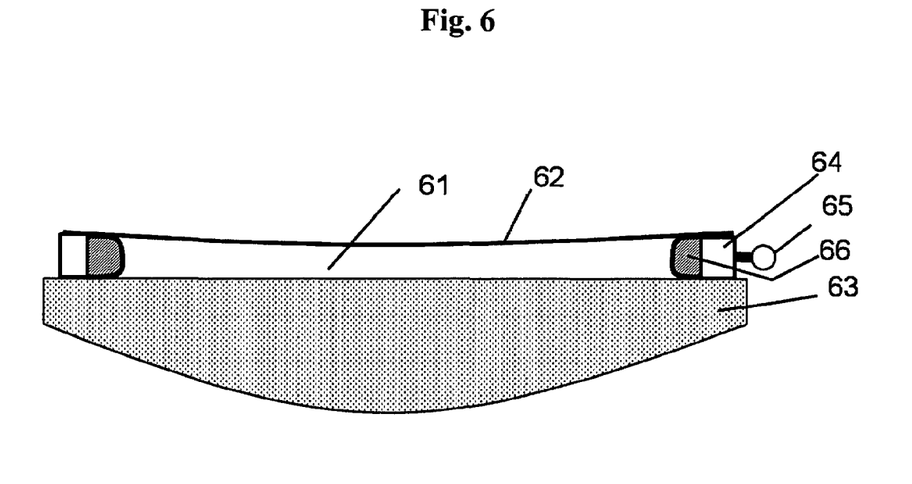
FIG. 6 is a cross-sectional view of one fluid lens cell of the present invention with a convex lens instead of the planar rigid substrate as shown in FIG. 3.

FIG. 6 shows a variable focus liquid filled lens where the planar rigid substrate is replaced by a convex lens. A liquid 61 is contained by a clear distensible membrane 62 and a plano-convex lens 63. A rigid periphery seal 64 is fitted with a lever actuator 65 that is used to manipulate the rotatable impellers 66. In the position shown in FIG. 6, the rotatable impellers are in a neutral position such that the surface of the distensible membrane 62 is flat.

Figure 7:
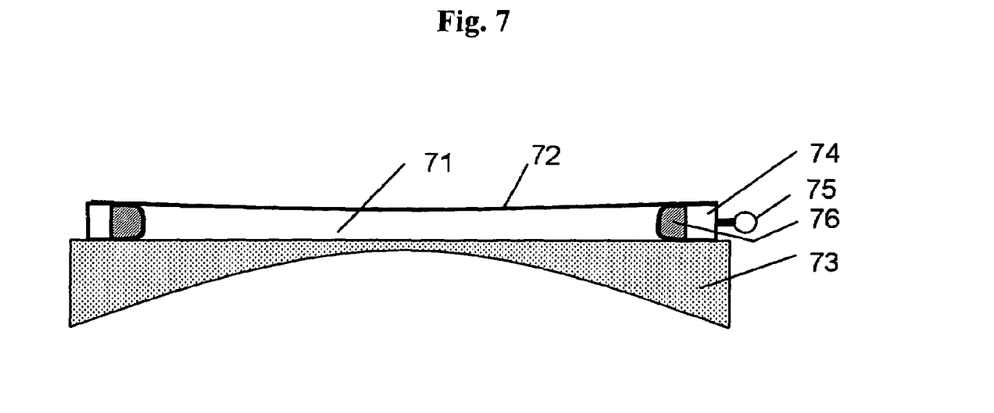
FIG. 7 is a cross-sectional view of one fluid lens cell of the present invention with a concave lens instead of the planar rigid substrate as shown in FIG. 3.

FIG. 7 shows a variable focus liquid filled lens of the present invention wherein the planar rigid substrate is replaced by a concave lens. A liquid 71 is contained by a clear distensible membrane 72 and a plano-concave lens 73. A rigid periphery seal is fitted with a lever actuator 75 to control the movement of the rotatable impellers 76. In FIG. 6, the rotatable impellers 76 are in a neutral position such that the surface of the distensible membrane 72 is flat.

Figure 8:
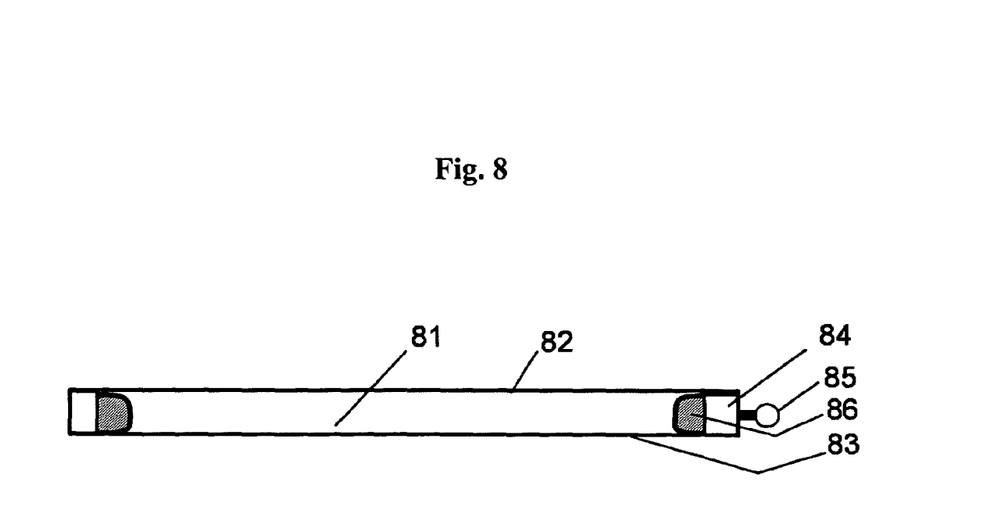
FIG. 8 is a cross-sectional view of one fluid lens cell of the present invention with an elastic membrane instead of the planar rigid substrate as shown in FIG. 3.

In FIG. 8 there is an elastic membrane 83 that replaces a rigid planar membrane or a concave lens or a convex lens opposite the clear distensible membrane 82 confining the liquid 81. The elastic membrane 83 can be made of the same material as the clear distensible membrane 82. The elastic membranes 82 and 83 sandwiching the liquid 81 are fitted with a rigid periphery seal 84 with lever actuator 85 to control the movement of the rotatable impellers 86. FIG. 8 shows the rotatable impellers 86 in a neutral position such that the surface of the distensible membrane 82 is flat.

Figure 9A:
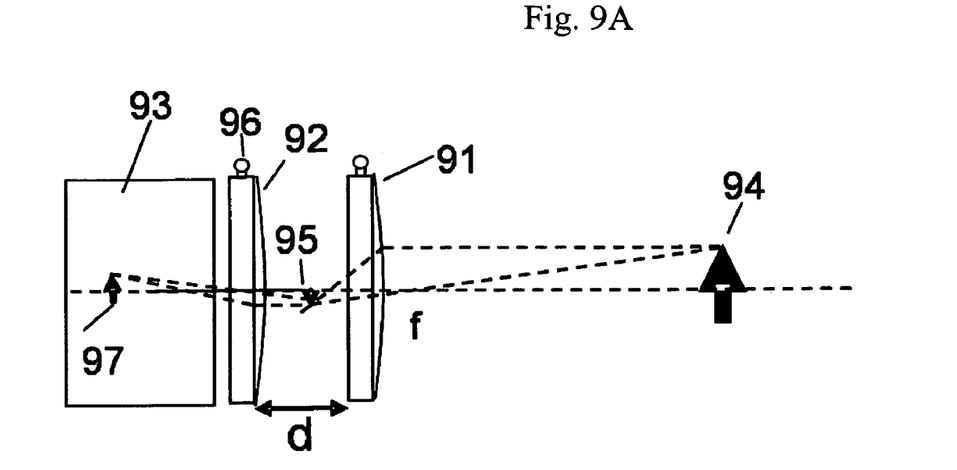
FIG. 9A shows the operation of the zoom lens using the two liquid lenses of the present invention.
Figure 9B:
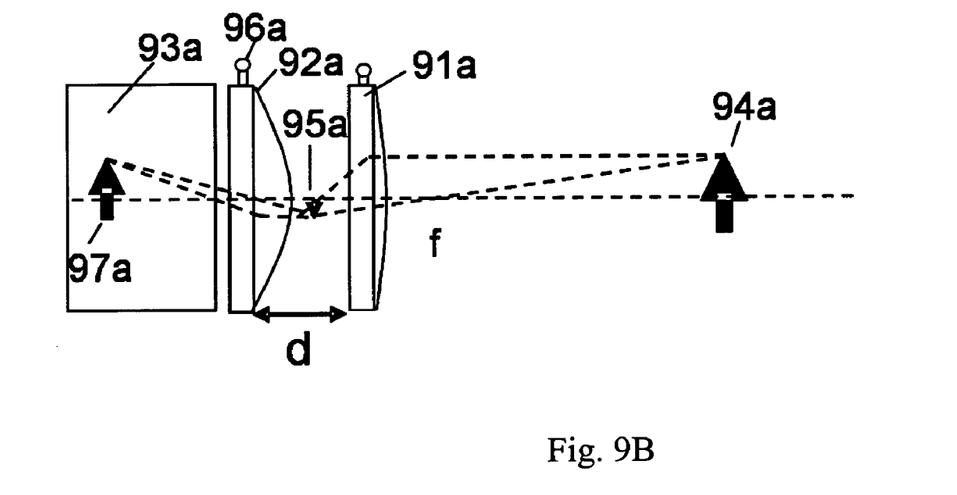
FIG. 9B shows the operation of the zoom lens when the lever actuator of one liquid lens is adjusted to engage the rotatable impellers such that one concave lens has a larger curvature. As a result, the zoom lens exhibits a shorter focal length.

FIG. 9 shows how the variable focus lens of the present invention can be used in a zoom lens consisting of two or more liquid lens. In FIG. 9A, a liquid lens 91 is combined with another liquid lens 92 positioned in front of a camera body 93 where an object 94 captures a first formed image 95. The lenses 91 and 92 have a small curvature so that the object 94 appearing in the camera sight has an upright image 97. The formed image 97 can be magnified or reduced from the original object 94 depending on the distance and curvatures of the lenses 91 and 92. In FIG. 9B, liquid lens 91a remains unchanged, while the curvature of 92a is enlarged so that the formed image 97a positioned in front of a camera body 93a is enlarged in comparison with that shown in FIG. 9A. The surface of the lens 92a is protruding outward as a result of the movement of the lever actuator 96a to engage the rotatable impellers in lens 92a such that a convex curvature is formed. The front surface of lens 92a has a larger curvature than that of 91a so that the object 94a appearing in the camera sight has a closer focus effect, i.e., it appears larger in the camera sight 97a. The tunable focus is achieved by changing the curvature of the membrane while keeping the lens distance unchanged.

EXAMPLE 1

Convex/Concave/Lens Structure

FIG. 1 shows a pair of spectacles using variable focus lenses according to the present invention, viewed from the wearer's side of the glasses. A unique feature of the spectacles or glasses is the lens cells. A fixed volume of clear liquid stored between the rigid substrate and the elastic membrane is sealed at the periphery edges of the substrates. The volume of the liquid can be changed significantly depending upon the thickness and size of the lens cell. The clear liquid can be water, ethanol, silicone oil, or any other clear oil. A circular periphery seal, with a movable lever actuator, is sealed with a distensible membrane then the periphery seal is adhesively attached to the lens cell. The circular periphery seal resembles a conventional iris diaphragm and has an adhesively attached rotatable impeller that can be mechanically or electro-mechanically activated with a lever. Thus, the annular or circular sealing ring with the distensible membrane is capable of changing its radius. By changing the radius of the periphery sealing ring, the liquid within the lens cell is redistributed such that the curvature of the elastic membrane is changed. To utilize the radius changing property of an iris diaphragm, the circular periphery seal including the movable impeller is wrapped using elastic membrane. Two significant benefits are realized. One benefit is to prevent liquid from leaking out of the lens cell; the other is to change the radius of the periphery sealing ring and cause the liquid to be redistributed.

When there is no change in the radius of the periphery sealing ring, the elastic membrane is flat and there is no focus effect as shown in FIG. 3, which shows the aperture of the iris diaphragm with radius $r_0$. When the radius of the diaphragm $r_1$ is tuned to be smaller than $r_0$ ($r_1 < r_0$), some liquid is squeezed and redistributed, thus a convex lens is formed as shown in FIG. 4. When the radius of the diaphragm $r_2$ is tuned to be larger than $r_0$, some liquid will flow quickly to fill the increased cavity. The redistributed liquid causes the lens assembly to become a concave lens, as shown in FIG. 5. The radius of the iris diaphragm is controlled by the movable impeller, and the impeller is controlled by the movable lever actuator which can be operated by hand or by motor. If by motor, the device can be programmed to change focal length continuously or in select discrete steps.

It is illustrated in FIGS. 3–5 that by controlling the lever actuator either mechanically or electro-mechanically, a liquid lens can be easily transformed from convex lens to concave lens or from concave lens to convex lens. The fabrication of different devices having lenses with tunable focus is shown in FIGS. 6, 7 and 8.

EXAMPLE 2

Light Focusing Power

The variation in optical power of an elastically deformable lens can be achieved by changing its radius. To estimate the optical focusing power, we use the lens structures shown in FIG. 3 and FIG. 4, as an example. In FIG. 3, when the radius of the lens aperture is $r_0 = 2$ cm and the thickness of the lens is $t = 3$ mm, the surface of the lens is flat and there is no focus effect. When the radius of the lens is reduced to $r_1 = 1.5$ cm, as shown in FIG. 4, the redistributed liquid will produce a liquid spherical cap. The height (h) and the radius (R) of the spherical cap is 0.25 cm and 8.25 cm, respectively. If the liquid is a solvent with refractive index n=1.5, then the focal length $f = R/(n-1) = 16.5$ cm, and the optical power is about 6.1 diopters. If the radius is reduced to $r_1 = 1.75$ cm and the thickness of the lens is $t = 4$ mm, then the optical power is about 4.8 diopters.

EXAMPLE 3

Zoom Lens Using Two Liquid Lenses

A zoom lens camera using two of the tunable-focus liquid lens of the present invention is fabricated. To get an upright image in the focal plane, two liquid lenses are needed. An object is placed before a first liquid lens with a positive focal length. The distance from the object to the first liquid lens is larger than its focal length, thus a small inverted image is obtained. A second liquid lens is placed behind the first liquid lens. The second liquid lens also has a positive focal length. The distance from the formed image to second lens is much larger than its focal length, thus a second smaller inverted image is formed again. After two times imaging, a smaller upright image is received on the focal plane of the camera body. Unlike a mechanical zoom lens used in a commercial camera, the distance from the first lens to the second lens is not changed in the present invention. The focal length of the second lens is tuned to be longer but shorter than the distance from the in-camera focal plane image to the second lens; when this arrangement occurs, a large upright image is received on the focal plane of the camera body. Therefore, by tuning the focal length of the liquid lens, a variable image size can be obtained.

The present invention provides a unique, easy to fabricate lens, device and system for changing the diameter and curvature of the liquid-filled lens to vary its focal length.

We claim:

1. A liquid filled variable focus lens system which is comprised of:
    a transparent wall member;
    a transparent distensible membrane;
    a layer of liquid stored between the wall member and the distensible membrane to form a liquid lens; and
    a rigid, annular periphery seal with a variable radius, between the transparent wall member and the transparent distensible membrane.

2. A liquid-filled variable focus lens of claim 1, wherein the wall member is at least one of a rigid planar substrate, a rigid plane-convex lens, a rigid plano concave lens, a rigid biconvex lens, a biconcave lens and a thin distensible membrane.

3. A liquid-filled variable focus lens of claim 2, wherein the wall member is adhesively attached to the rigid periphery seal.

4. A liquid-filled variable focus lens of claim 1, wherein the transparent distensible member is adhesively attached to the rigid periphery seal.

5. A liquid-filled variable focus lens of claim 1, wherein the rigid periphery seal between the transparent wall member and the transparent distensible membrane is a conventional iris diaphragm wrapped in a distensible membrane.

6. A liquid-filled variable focus lens of claim 1, wherein the rigid annular periphery seal contains rotatable impellers.

7. A liquid-filled variable focus lens of claim 6, wherein the inner surface of the rigid annular periphery seal is covered with a distensible membrane.

8. A liquid-filled variable focus lens of claim 7, wherein the distensible membrane is adhesively attached to the periphery seal.

9. A liquid-filled variable focus lens of claim 6, wherein the rotatable impellers are controlled by a lever actuator.

10. A liquid-filled variable focus lens of claim 9, wherein the lever actuator is rotated by at least one of a mechanical means and an automatic means.

11. A zoom lens comprising:
  at least two liquid lenses each having a curvature each of the at least two liquid lenses comprising:
    a transparent wall member;
    a transparent distensible membrane;
    a layer of liquid stored between the wall member and the distensible membrane to form the liquid lens; and
    a rigid, annular periphery seal with a variable radius, between the transparent wall member and the transparent distensible membrane, wherein the zooming ratio is adjusted by the curvature of the membrane covering the lens rather than the distance between the lenses.

12. A rigid annular periphery seal for a variable focus, fluid-filled lens that comprises
  a lever actuator;
  a movable impeller; and
  a distensible membrane cover that operably vary the radius of the periphery seal.

13. The rigid annular periphery seal of claim 12, wherein the movable impeller and lever actuator are parts of an iris diaphragm.

14. The rigid annular periphery seal of claim 12, wherein the seal is an iris diaphragm that is adhesively attached to a fluid-filled lens.

15. The process for making a variable focus liquid-filled lens comprising the steps of:
  forming a cavity between a first transparent membrane and a second transparent membrane, with at least one of the membranes being flexible;
  filling the cavity with a transparent fluid to form the liquid lens;
  scaling the cavity with a periphery sealing ring containing a ever actuator and a movable impeller covered with a distensible membrane that is operated to produce variations in the radius of the periphery sealing ring.

16. The process of claim 15, wherein the first transparent membrane is flexible and is selected from one of the following materials: elastomeric rubber, rubber-like compound, elastic polymer, and polyvinylidene chloride film (Saran).

17. The process of claim 15, wherein the second transparent membrane is selected from one of the following materials: glass plate, clear crystal plate, transparent plastic, rigid clear polymer, elastomeric rubber, rubber-like compound, and polyvinylidene chloride film (Saran).

18. The process of claim 15, wherein the periphery sealing ring is made of at least one of a light-weight plastic, light-weight metal, light-weight crystal, light-weight glass, and light-weight, solid polymeric resin.

19. The process of claim 15, wherein the lever actuator and movable impeller are parts of an iris diaphragm.

20. The process of claim 15, wherein the periphery sealing ring is an iris diaphragm.

* * * * *